Feb. 7, 1961 H. F. WINDSOR 2,970,930
LUMINESCENT SCREEN SETTLING
Filed Jan. 28, 1959

INVENTOR:
HAROLD F. WINDSOR,
BY Robert J Mooney
HIS ATTORNEY.

United States Patent Office 2,970,930
Patented Feb. 7, 1961

2,970,930

LUMINESCENT SCREEN SETTLING

Harold F. Windsor, Syracuse, N.Y., assignor to General Electric Company, a corporation of New York Filed Jan. 28, 1959, Ser. No. 789,562

10 Claims. (Cl. 117—33.5)

The present invention relates to improvements in the liquid settling process of making screens for cathode ray tubes and the like.

In one known liquid settling process of cathode ray tube screening, the interior surface of the faceplate of the cathode ray tube envelope or other substrate on which the screen is to be formed is covered with a suitable cushioning liquid, preferably of an electrolytic type such as a water solution of an ionizable salt. The phosphor or luminescent screen material together with a suitable water soluble binder such as aqueous potassium silicate is mixed with the cushioning liquid to form a screening solution, and the phosphor is allowed to settle through the screening solution onto the surface of the faceplate. After sufficient phosphor has settled to form a screen of the desired thickness, the supernatant liquid is removed, as by decanting or siphoning off, and the screen is dried.

One disadvantage of the foregoing method arises from the fact that generally the faceplate is curved, and hence the depth of the cushioning liquid covering the faceplate varies across the faceplate, usually being deepest at the center of the faceplate and shallowest toward its periphery. Because the finely divided screen material settling through the screening solution usually deposits on each incremental portion of the faceplate to a thickness proportional to the depth of the liquid covering that incremental portion, the liquid-settled layer of screen material tends to be thickest at the center and least thick toward the edge of the faceplate. This variation in thickness of settled screen material is maintained even after the supernatant liquid is removed and the screen is dried. This variation in screen thickness is undesirable because it produces a corresponding variation in the color of the visible light developed by the screen responsive to cathode ray bombardment, the type of phosphor widely used in monochrome television picture tubes tending, for example, to be yellow at the faceplate center due to excessive thickness and blue toward the faceplate edge. Another disadvantage of the variation in phosphor thickness is that when the phosphor thickness near the edge of the faceplate is sufficient to satisfy minimum requirements, the additional phosphor thickness at the center of the faceplate represents an excess of phosphor which is costly, and quite unnecessary from a functional standpoint.

Accordingly, a principal object of the present invention is to provide an improved method of liquid-settling luminescent screens for cathode ray tubes and the like wherein the settled luminescent material is distributed with an improved degree of uniformity.

Another object is to provide an improved screening process which is substantially independent of temperature.

Another object is to eliminate a need heretofore felt in the prior art for carefully controlling distribution of phosphor through the cushioning liquid during the time the phosphor is being introduced into the cushioning liquid.

Another object is to provide an improved cathode ray tube screen having a minimum variation in color from center to edge.

Still another object is to provide an improved method, affording a substantial saving in the time heretofore required, for producing multiple phosphor layer screens.

Another object is to provide an improved screening process requiring substantially reduced quantities of screen material and other screening solution ingredients, in comparison with the prior art.

Another object is to provide an improved screening process which eliminates the need for the large hydrostatic head heretofore employed to give good mixing and distribution of screen material.

These and other objects will be apparent from the following description taken in conjunction with the accompanying drawing, wherein.

Briefly, in accordance with the invention, I generate specially shaped fluid flow patterns or currents in the liquid cushion through which the screen material is settling, while the settling is taking place. The flow currents generated preferably form a somewhat toroidal shaped flow pattern in the charge of liquid covering the faceplate, the flow being in a generally upward direction (i.e. away from the faceplate) adjacent the center of the faceplate, in a radially outward direction toward the periphery of the faceplate near the surface of the liquid, in a generally downward direction toward the faceplate near the periphery of the faceplate, and radially inwardly toward the center of the faceplate near the faceplate surface. I have discovered that the flow currents thus produced tend to prevent the collection of an excessive thickness of phosphor at the center of the faceplate while relatively increasing the phosphor thickness toward the periphery of the faceplate, with the result that an enhanced degree of uniformity of thickness of the settled phosphor layer is produced. As described more fully hereinafter, various means may be employed to generate the desired flow currents in the liquid cushion, such as producing a flow of gas bubbles through the liquid in a selected pattern, generating thermal gradients, and producing mechanical propulsion of the liquid by various means.

Figure 1:
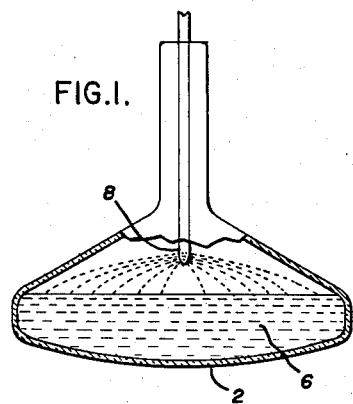
Fig. 1 shows a cathode ray tube envelope, undergoing part of a prior art liquid settling screening process.

Referring to Fig. 1 there is shown an exemplary cathode ray tube envelope including a faceplate 2 having a curved interior surface providing a substrate on which a layer of particulate phosphor material forming a luminescent screen is to be formed by liquid settling. In the liquid settling of the screen there is first dispensed into the tube envelope a charge of cushioning liquid 6. The cushioning liquid may be a neutral liquid such as water but preferably is an electrolytic solution such as a weak water solution of an ionizable salt, for example barium acetate, having a concentration preferably of about .01 percent to .04 percent by weight. Into the cushioning liquid is dispensed a suspension or slurry of powdered or finely ground phosphor or other luminescent material in a suitable binder such as a water solution of sodium, potassium or other water soluble silicate. Conventionally, the slurry may be poured directly into the cushioning liquid and the resulting mixture well agitated to give even distribution of the phosphor particles throughout the mixture before settling is allowed to take place, or the slurry may be evenly distributed on top of the cushioning liquid, as by spraying thereon from a nozzle 8 disposed above the cushioning liquid, and settling thereafter allowed to take place. Still other alternative procedures for bringing together the necessary ingredients may be employed within the contemplation of the present invention, such as for example placing the binder in the cushioning liquid separate from the phosphor and subsequently dispensing the phosphor into or onto the cushioning liquid. In any event the same ingredients are involved, namely phosphor, binder, and cushioning liquid, and the phosphor is settled through the cushioning liquid together with the binder and becomes deposited on the interior surface of the faceplate.

Figure 2:
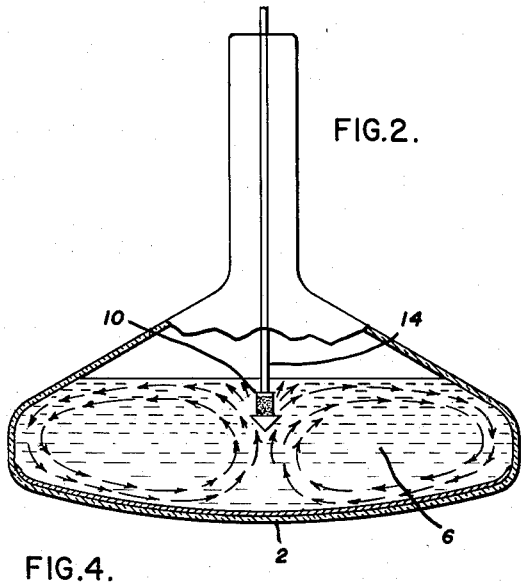
Fig. 2 is an enlarged view similar to Fig. 1 and showing in diagrammatic form fluid flow currents generated in the settling solution according to the present invention.
Figure 3:
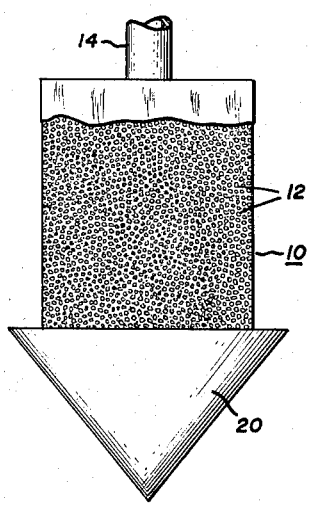
Fig. 3 is an enlarged view of a portion of the structure shown in Fig. 2.

In accordance with the present invention, I generate toroidally shaped flow patterns or currents in the liquid 6 while the screen forming ingredients are settling through it, the flow currents generated being generally upward at the center, outward at the surface of the liquid, downward adjacent the periphery, and inward adjacent the faceplate surface. While various means may be employed to generate the desired flow pattern, one form of apparatus which has been found to be particularly suitable for generating the desired flow currents is shown in Figure 2 and includes a nozzle 10 having a multiplicity of fine orifices 12, as shown in Figure 3, such as to render the nozzle effectively porous, the nozzle being supplied with a suitable non-reactive gas, such as air, at low pressure of the order of a few pounds per square inch, through a pipe 14. The air or other gas supplied to the nozzle 10 flows out through the fine orifices 12 in the nozzle beneath the surface of the liquid 6 and forms fine bubbles in the liquid which flow up to the surface. The flow of the bubbles upward from the nozzle 10 to the liquid surface induces the desired generally toroidally shaped flow pattern in the liquid as shown in Figure 2, namely upward adjacent the center, outward at the top of the body of liquid, downward adjacent the periphery of the faceplate and inward adjacent the surface of the faceplate. According to the invention, I have discovered that this flow of the liquid carries with it the phosphor particles and other screen ingredients which are settling through the liquid 6 and distributes the phosphor in a desirably uniform manner such that the thickness of the screen at its periphery is relatively increased, and the thickness near the center of the faceplate is relatively decreased, in comparison with results obtained in the absence of such toroidal flow. The direct result is that the settled screen has a much more uniform thickness than that heretofore obtainable.

While the nozzle 10 or outlet of the air pipe 14 may consist of any suitable means for forming a multiplicity of small bubbles, one form of porous nozzle which has been found to be particularly satisfactory is a common aquarium air stone of the type used generally to aerate the water of household aquariums. Such a structure is shown in detail in Figure 3 and consists of a block of synthetically constructed porous stone-like material having a multiplicity of tiny orifices 12 therein. While the bubble size does not appear to be critical, good results have been obtained with bubbles of about 1/32 inch diameter, and bubbles of this size are readily obtained with an air stone such as shown. Preferably the cross-sectional shape of the nozzle 10, in a plane parallel to the faceplate 2, may correspond roughly to the faceplate shape. That is, if the faceplate is rectangular, the nozzle cross-section should be rectangular, while if the faceplate is circular the nozzle cross-section should be circular, for desirable distribution of flow currents. To prevent diffusion of bubbles in a downward direction within the liquid, which would have an adverse or inhibiting effect on producing the desired upward flow in the liquid adjacent the center of the faceplate, the lower surface of the porous nozzle is preferably covered or masked off by any suitable means such as the baffle 20. Preferably the baffle 20 is streamlined so as to induce a minimum of undesired swirls or eddies in the flow upward past it.

The depth of immersion of the bubble source in the liquid is not particularly critical, and may vary from closely adjacent the liquid surface to several inches below the liquid surface. Likewise excellent results have been obtained over a wide range of gas flow rates. Using air, for example, the rate may be as low as a few hundred cc./minute or as high as several liters/minute and higher. Also, in general, the deeper the cushion of liquid 6, the lower is the gas flow rate necessary for desirable phosphor distribution.

Figure 4:
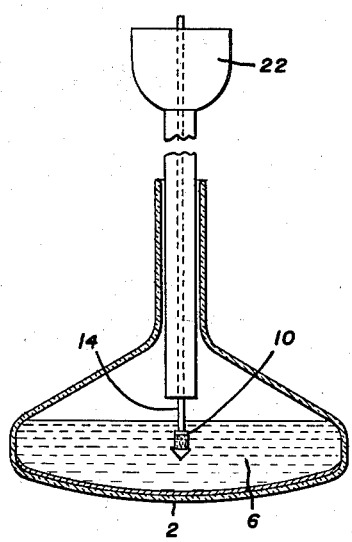
Fig. 4 shows one form of apparatus for carrying out the invention.

The following is a specific example of the screening of a cathode ray tube according to the present invention. Into a monochrome television picture tube bulb having a diagonal faceplate dimension of nominally 17 inches is introduced a charge of about 6000 cc. of cushioning liquid, sufficient to cover the faceplate to a depth of about 5 inches. The cushioning liquid may consist of a mixture of deionized water containing a barium acetate electrolyte in a concentration of about .03% by weight. Into this solution is introduced, as by pouring onto the surface through a funnel 22 as shown in Figure 4, a phosphor-binder slurry consisting of about 4.3 grams of type P-4 silver activated zinc sulfide-cadmium sulfide phosphor together with a binder in the form of about 1000 cc. of water and sufficient potassium silicate to produce in the aggregate volume of liquid a silicate concentration of about 0.8% by weight. A toroidal flow pattern is then generated in the liquid body by immersing therein, above the center of the faceplate, a porous nozzle consisting of an aquarium air stone of generally cubical shape measuring about 3/4" on a side, immersed about 1/2" below the liquid level, and to which air is supplied at a pressure of about 1 to 4 p.s.i. and at a flow rate of about 1 to 3 liters per minute. The air is bubbled through the porous nozzle throughout the entire time that the phosphor is settling, in this case about one-half hour, at an ambient liquid temperature of about 22° C. After settling is completed, the supernatant liquid is removed, as by decanting or siphoning.

Figure 5:
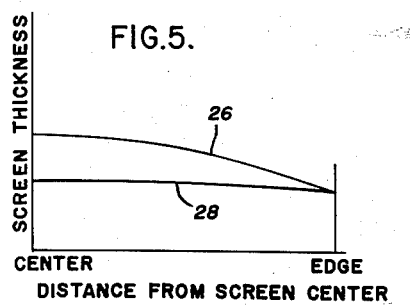
Fig. 5 is a graph showing certain screen characteristics obtainable by the present invention.

Fig. 5 shows a graph illustrating the improved distribution of phosphor that is obtainable in accordance with the screening process above described. As shown in Fig. 5 by curve 26, when the screen is applied according to prior art methods, the phosphor thickness is much greater near the center of the screen than at the edge, while with the present invention, as shown by curve 28, the screen thickness is much more uniform, with the thickness at the center being only slightly more than the thickness at the edge. Since the edge thickness determines the minimum phosphor limit for a satisfactory screen, it will be appreciated that the present invention provides a substantial saving in phosphor, proportional to the difference in area under the respective curves 26 and 28, while at the same time greatly reducing the tendency toward "yellow center" heretofore manifest. It has been found experimentally, for example, that savings in phosphor of the order of 35% can be achieved by the present invention, with no sacrifice in screen quality.

Figure 6:
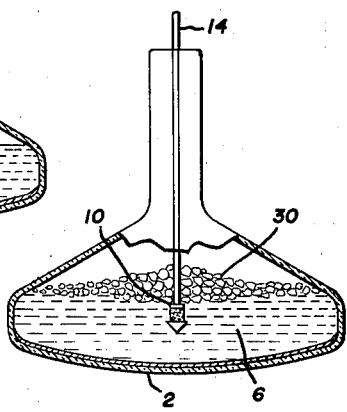
Fig. 6 is a view similar to Fig. 4 showing an alternative form of the present invention.

Various other suitable means may be employed to generate the desired toroidal flow currents in the liquid 6. In addition to the gas bubbling method above described, for example, small propellers or other mechanical pumping devices may be immersed in the liquid, or a suitable thermal gradient may be produced in the liquid as by application of a heat source to the center of the faceplate so as to produce upwardly directed convection currents in the liquid, Fig. 6 shows a modification of the foregoing method. As shown in Fig. 6, it has been found that addition to the liquid cushion of a small amount of a suitable foaming agent, for example in an amount equivalent to about .006% by volume of the liquid 6, will in combination with the gas bubbling action, produce a blanket of foam 30 on top of the liquid which is thickest at its center and dissipates adjacent the periphery of the liquid surface. One such suitable foaming agent is a polyoxypropylene glycol such as that known as "L6 Pluronics," and available from the Wyandotte Chemical Company. It has been found that such a foam layer undergoes continual movement from the center of the liquid surface radially outwardly, and thus assists in conveying in a radially outward direction particles of phosphor adjacent the surface of the liquid, thereby enhancing the desired toroidal flow.

The improved process above-described achieves better mixing of the binder and electrolyte than heretofore, while eliminating the need for introducing the phosphor and binder with a large pressure head or other means of vigorously agitating the ingredients to obtain good mixing of binder and electrolyte. Thus the present invention provides better adherence of the settled screen to its substrate. Also the present invention is particularly useful in the making of screens having plural layers of phosphors, because by avoiding the need for agitation of the liquid cushion heretofore required to achieve distribution, there is also avoided the adverse effects of such agitation on the phosphor layer or layers already settled. As a result multi-layer screens can be made in substantially less time than heretofore required.

The above-described invention has many important advantages in addition to those already mentioned. The saving in phosphor enables a corresponding reduction in the other screening ingredients, with a commensurate reduction in cost. Moreover the deliberately generated toroidal flow currents render the screening process much less sensitive to effects of temperature eliminating any need for controlling the temperature of the various ingredients, as heretofore customary. Also the toroidal flow makes the screening process much less sensitive to the heretofore troublesome adverse effects of vibration such as may be encountered in factory screening apparatus. Finally, the generated flow currents prevent the heavier phosphor particles from being concentrated near the center of the screen as heretofore, and produce a more uniform distribution of both light and heavy phosphor particles across the entire screen, with the lighter particles uniformly filling the voids between the heavier particles to give a screen surface of enhanced smoothness which will in turn inherently enable the formation of a higher quality metallic reflecting layer thereon.

It will be appreciated by those skilled in the art that the invention may be carried out in various ways and may take various forms and embodiments other than those illustrative embodiments heretofore described. It is to be understood that the scope of the invention is not limited by the details of the foregoing description, but will be defined in the following claims.

What I claim as new and desire to secure by Letters Patent of the United States is:

1. The method of coating a substrate with luminescent material comprising covering the substrate with a body of liquid to form a liquid cushion, gravitationally depositing luminescent material from the liquid cushion onto the substrate, and simultaneously generating fluid flow currents in the liquid having an upward direction in the vicinity of the center of the area desired to be coated and a downward direction in the vicinity of the periphery of the area desired to be coated.

2. The method of coating a substrate with luminescent particulate material comprising covering the substrate with a body of liquid to form a liquid cushion, adding a foaming agent to said liquid cushion, introducing the luminescent particulate material into the liquid cushion for gravitational deposition therefrom onto the substrate, and simultaneously with said gravitational deposition generating fluid flow currents in the liquid cushion having an upward direction in the vicinity of the center of the area desired to be coated and a downward direction in the vicinity of the periphery of the area desired to be coated.

3. The method of making a cathode ray tube screen which comprises settling particulate phosphor material through a liquid cushion onto a substrate, and simultaneously generating in the liquid cushion a fluid flow pattern such that the liquid flows upwardly at its center, outwardly adjacent its surface, downwardly adjacent its periphery, and inwardly adjacent the substrate.

4. The method of coating a substrate with luminescent material comprising covering the substrate with a layer of liquid, introducing the luminescent material into the liquid for gravitational deposition therefrom onto said substrate, and simultaneously with said gravitational deposition producing gas bubbles in the liquid adjacent the center thereof so as to generate flow currents in the liquid having an upward direction in the vicinity of the center of the area desired to be coated and a downward direction in the vicinity of the periphery of the area desired to be coated.

5. The method of coating a substrate with luminescent material comprising covering the substrate with a layer of liquid, adding a foaming agent to the liquid, introducing the luminescent material into the liquid for gravitational deposition therefrom onto said substrate, and simultaneously with said gravitational deposition producing gas bubbles in the liquid adjacent the center thereof so as to generate flow currents in the liquid having an upward direction in the vicinity of the center thereof and a downward direction in the vicinity of the periphery thereof.

6. The method of depositing a layer of luminescent phosphor on a substrate which comprises covering the substrate with a liquid cushion, generating in the liquid cushion a toroidal-shaped fluid flow pattern such that the liquid flows upwardly in the vicinity of the center of the substrate, outwardly adjacent the liquid surface, downwardly adjacent the periphery of the cushion, and inwardly adjacent the substrate, and introducing a slurry including phosphor and a liquid vehicle into said cushion in the vicinity of the center of said cushion.

7. The method of coating a substrate with luminescent material comprising covering the substrate with a layer of liquid, generating flow currents in the liquid having an upward direction in the vicinity of the center of the area desired to be coated and a downward direction in the vicinity of the periphery of the area desired to be coated, the velocity of said flow currents in said upward direction being greater than the velocity of said flow currents in said downward direction, and introducing luminescent material into the liquid for gravitational deposition therefrom onto said substrate.

8. In a method of making a luminescent screen for a cathode ray tube or the like which includes the steps of covering a substrate with a layer of cushioning liquid containing particles of luminescent material and a water soluble binder for securing said particles together, allowing the luminescent material and binder to settle through the cushioning liquid onto the substrate in a layer of desired thickness, removing the cushioning liquid, and drying the layer of settled material in place on the substrate, the improvement comprising generating in said cushioning liquid during settling of said luminescent material fluid flow currents having an upward direction adjacent the center of the cushioning liquid, an outward direction adjacent the surface of the liquid, a downward direction adjacent the periphery of the liquid, and an inward direction adjacent the substrate.

9. The method of liquid settling a fluorescent screen on the faceplate of a cathode ray tube which comprises supporting the tube with the faceplate thereof downward, introducing a quantity of liquid into the tube to form a cushion covering the interior surface of the faceplate, producing bubbles in said liquid cushion at a location beneath the surface thereof and above the central portion of said faceplate, whereupon said bubbles in ascending to the surface of said liquid cushion generate fluid flow currents in said liquid having an upward direction adjacent its center, outward adjacent its surface, downwardly adjacent its periphery, and inward adjacent the faceplate, and gravitationally depositing fluorescent phosphor screen material through said liquid cushion onto said faceplate while said bubbles are being produced.

10. The method of making a multiple phosphor layer cathode ray tube screen which comprises covering a substrate with a liquid cushion, generating in the liquid cushion a fluid flow pattern such that the liquid flows upwardly in the vicinity of the center of the substrate, outwardly adjacent the liquid surface, downwardly adjacent the periphery of the liquid cushion and inwardly adjacent the substrate surface, introducing a first fluorescent phosphor screen material into said liquid cushion while said flow pattern is being generated for gravitational deposition of said first phosphor onto said substrate, and introducing successive respective fluorescent phosphor screen materials into said liquid cushion while said flow pattern is being generated for gravitational deposition thereof in succession onto said first phosphor.

References Cited in the file of this patent

UNITED STATES PATENTS

| | | |
|---|---|---|
| 2,328,292 | Painter | Aug. 21, 1943 |
| 2,726,167 | Emmens | Dec. 6, 1955 |
| 2,732,314 | Kaplan | Jan. 24, 1956 |
| 2,733,163 | Steadman | Jan. 31, 1956 |
| 2,760,882 | Teves et al. | Aug. 28, 1956 |
| 2,832,694 | Vodicka | Apr. 29, 1958 |